Dec. 7, 1954      P. E. OHMART      2,696,564
RADIO ELECTRIC GENERATOR
Filed June 27, 1951      3 Sheets-Sheet 1
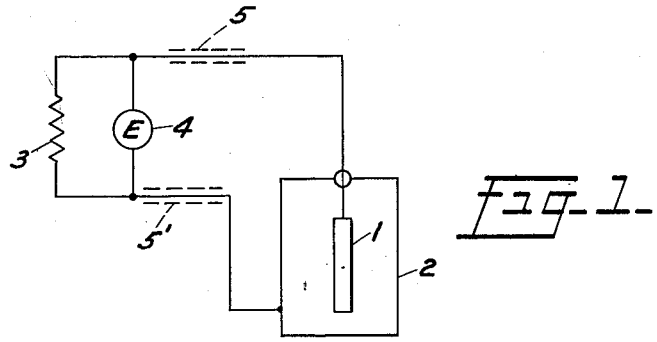
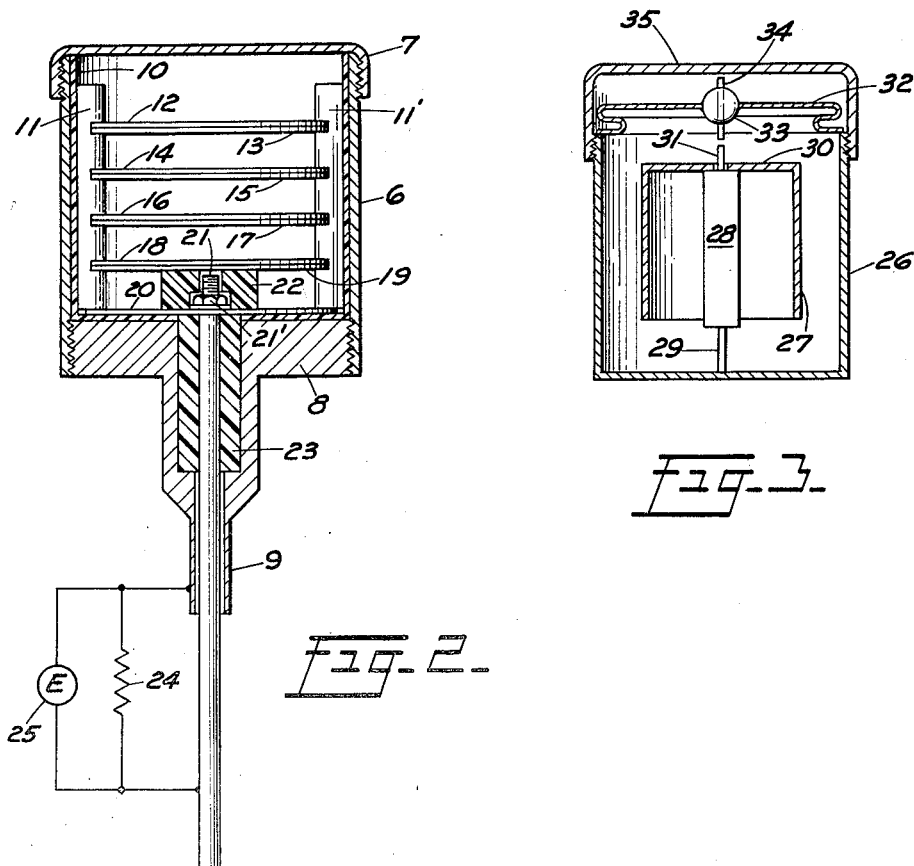
INVENTOR
Philip E. Ohmart
BY
Roland A. Anderson
ATTORNEY Dec. 7, 1954 P. E. OHMART 2,696,564
RADIO ELECTRIC GENERATOR
Filed June 27, 1951 3 Sheets-Sheet 2
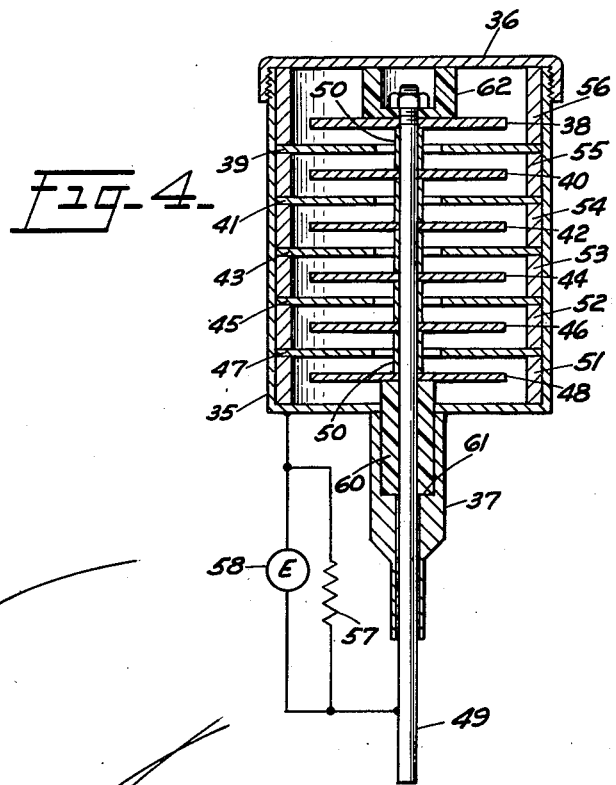
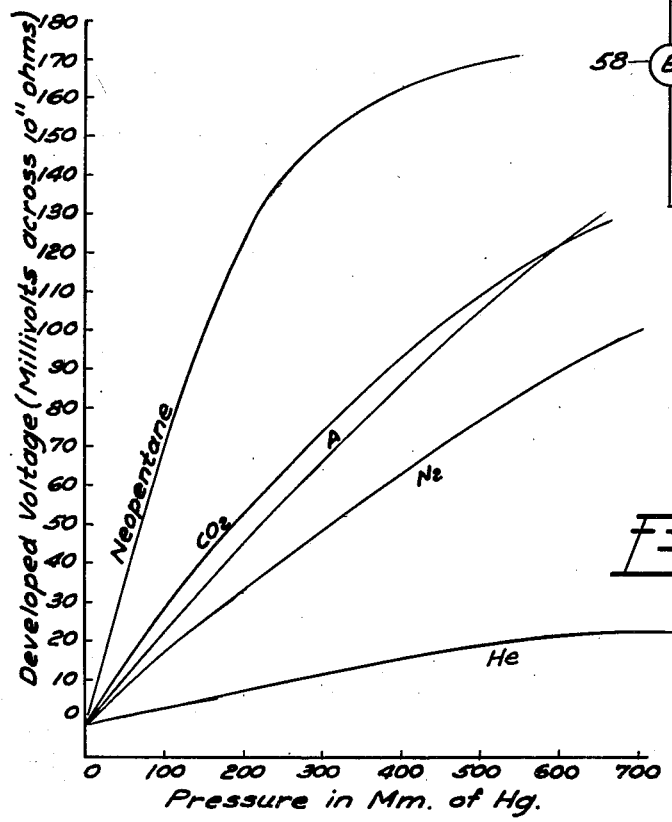
INVENTOR
Philip E. Ohmart
BY
Roland A. Anderson
ATTORNEY Dec. 7, 1954  P. E. OHMART  2,696,564
RADIO ELECTRIC GENERATOR
Filed June 27, 1951  3 Sheets-Sheet 3
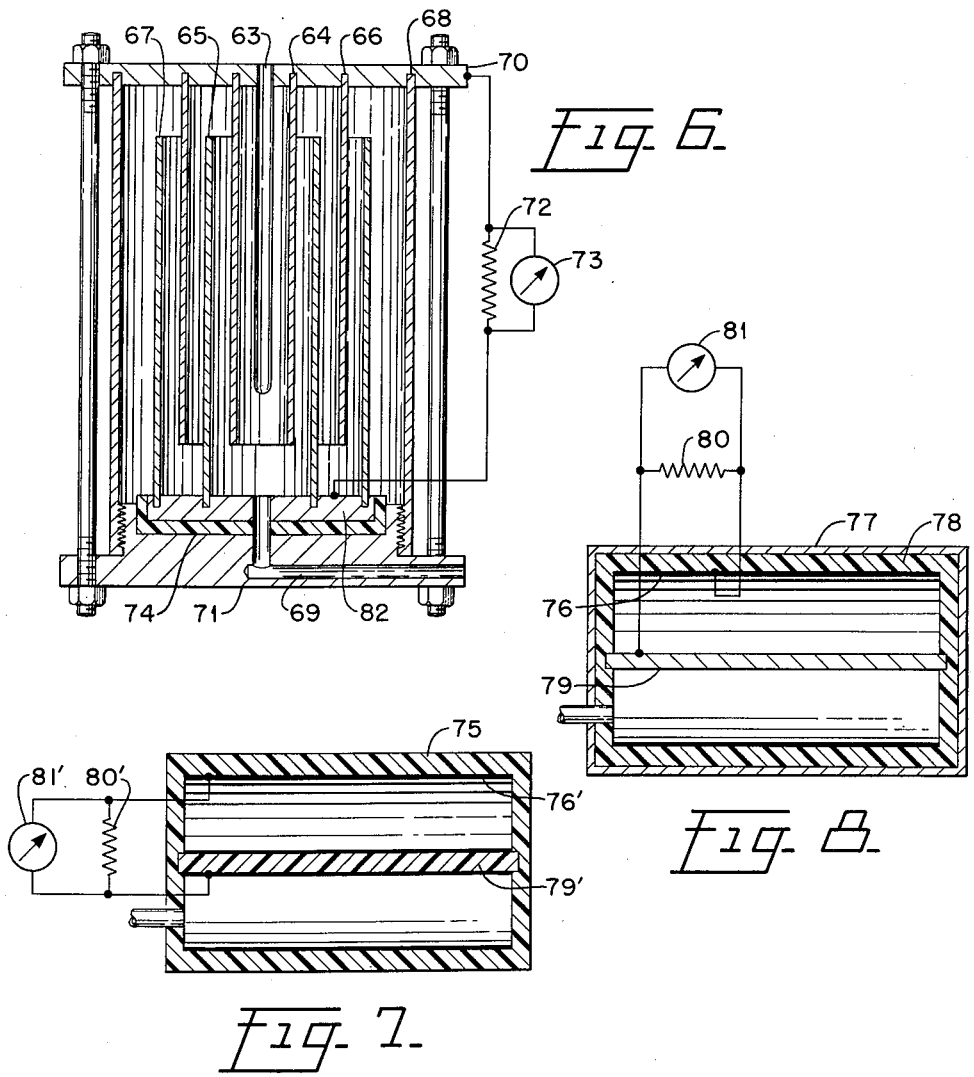
INVENTOR.
BY PHILIP E. OHMART
Roland A. Anderson
ATTORNEY

United States Patent Office 2,696,564
Patented Dec. 7, 1954

2,696,564

RADIO ELECTRIC GENERATOR

Philip E. Ohmart, Dayton, Ohio, assignor to the United States of America as represented by the United States Atomic Energy Commission Application June 27, 1951, Serial No. 233,718

8 Claims. (Cl. 250—83.6)

The present invention relates to the generation of electrical energy, and more especially to novel methods of and apparatus for converting the energy of radioactive radiations directly to electrical energy.

An important field wherein my invention can be utilized readily is the art of detection and measurement of radioactive radiations, such as alpha and beta particles, gamma and X-rays, and neutrons. In the prior art of radiation detection, two spaced electrodes have been electrically insulated from one another and enclosed in a gas-filled chamber. A source of electrical energy is connected in series with the electrodes. When radiations ionize the chamber gas, positive ions are attracted toward the electrode connected to the negative terminal of the power source, while electrons are accelerated toward the opposite electrode. Current will then flow in the series circuit from the positive terminal of the source through the chamber and back to the negative terminal. In such instruments, the chamber acts as a current regulator, which the incident ionizing radiation serves to control.

In the conventional instruments, the weight and space requirements of the batteries and/or electronic components designed to furnish the necessary chamber accelerating voltage may make the detectors undesirably large and heavy, so that they are cumbersome to carry about. Moreover, the insulation of the high-voltage electrode can be very troublesome, especially for voltages as great as 800–1000 volts. The careful insulation required both adds to the cost of manufacture and furnishes a source of spurious pulses or counts in field operation of the instruments, especially in conditions of high humidity. The collecting electrode must be even more carefully insulated to prevent fluctuations of charge on the insulators, which may alter the potential of the electrode directly or by induction. In addition, conventional ion chamber response is very sensitive to changes or fluctuations in the high voltage supply. Moreover, statistical fluctuations in radiation from the source of radioactivity are directly observable on the indicating meter frequently associated with conventional detectors, because the ions formed are collected very rapidly by the charged electrodes. Further, the charge stored in the conventional electroscope type of personnel monitor is subject to leakage, so that the instruments have to be recharged at short intervals, and may be rendered useless by dropping or other rough handling.

However, I have discovered a novel method and provided new and improved apparatus for such detection wherein no ion-chamber voltage supply is required, and as a consequence, no high-voltage insulation between electrodes is needed, and no highest quality collecting electrode insulator is required. I have discovered that if two electrochemically dissimilar materials forming electrodes are separated by an ionizable gas, a current may be generated through an external load impedance when ionizing radiations bombard the gas. Utilizing my discovery, I can provide a novel electrical generator. Moreover, I can provide a radiation detector comprising only three of the four elements of prior art detectors heretofore considered absolutely essential to their operation: i. e., first and second spaced electrodes, a source of electrical current connected in series with the counter, and an ionizable medium separating the electrodes. With my novel apparatus I utilize a portion of the energy of the radioactive radiations to generate directly an electric current, and thereby can omit entirely the third element above listed: the electrical current source. With my novel apparatus, I am able to generate within the detector or cell a proportionate electrical current from the energy of incident radiation, in contradistinction to detectors of the prior art which, like adjustable current regulators, draw controllable amounts of load current from an external power source. Whereas prior ionization chamber-type detectors operate to draw current, like an electric motor, my novel detector serves to produce a current, like an electric generator.

Moreover, I have found that the current generated in my device does not reflect the statistical variation in radiation as does current from conventional detectors, nor is there any fluctuation due to an unstable voltage supply, and accordingly I can obtain much more accurate and precise visual meter readings than is possible with the devices used in the prior art.

In addition, I can utilize the effect described above to analyze alloys; to measure the rate of growth of surface films and oxides; to measure vacuum and pressure; to measure humidity; to analyze gases; and in other measurements and analyses where a variable is related to the above-described factors. Therefore, it is the primary object of my invention to provide a method of and apparatus for generating an electrical current from the energy of radioactive radiations.

Another object of my invention is to provide an electrical generating system comprising a pair of electrodes spaced apart within an ionizable medium, a source of ionizing radiations, and a load impedance in circuit with the electrodes.

Yet another object of my invention is to provide novel methods of and apparatus for detecting and measuring the intensity of radioactive radiations.

Still another object of my invention is to provide a radiation detector which itself serves to generate an electrical current from the energy of the ionizing radiations, and accordingly requires no external source of electrical energy such as batteries, or the electrical mains.

A further object of my invention is to provide a personnel dosimeter which may be carried uncharged on the person indefinitely, yet which will be constantly sensitive to radiation received at any time.

Yet a further object of my invention is to provide a radiation-measuring instrument which may be read with great precision despite statistical variations in radioactivity received.

Other objects of my invention will become apparent from the following description, when read in connection with the accompanying drawings, in which:

Figure 1 is a schematic representation of a simple form of my electric current generator, Figure 2 illustrates a specific embodiment of a current generator constructed especially for a gamma radiation detector, according to the principles of my invention;

Figure 3 illustrates one useful configuration of a radiation dosimeter adapted to be carried in the pocket of personnel liable to exposure to damaging amounts of radiation, Figure 4 illustrates a more efficient current generator and detector for radiation utilizing the novel teachings of my invention, and Figure 5 illustrates the manner in which the voltage developed by the cells of my invention may vary with the type and pressure of filling gas employed.

Figure 6 illustrates a coaxial type cell, wherein a plurality of electrodes form concentric annular chambers.

Figure 7 illustrates one form of neutron-sensitive cell, and

Figure 8 illustrates a second form of neutron-sensitive cell utilizing the principles of my invention.

Referring now to Figure 1, a simple cell comprises a center electrode 1, and an outer electrode or shell 2. Load resistance 3, shunted by electrometer 4, is connected electrically between the two electrodes 1, 2. These electrodes are formed from electro-chemically dissimilar materials. For example, outer electrode 2 may be simply a 2–S aluminum box, 3 x 7½ x 7½ inches, preferably closed at the ends, and the center electrode 1 may be a lead dioxide plate 4½ x 5 x 1/32 inches disposed within the box and electrically insulated therefrom in any convenient manner. For example, a simple teflon mounting may hold the electrode 1, and a glass bead may be provided to allow lead 5 to pass through electrode 2. Leads from the electrodes may connect to the electrometer and load resistor through shielded cables 5, 5'. The Ultraohmmeter, distributed by Beckman Instrument Company, serves as a satisfactory electrometer for measuring the voltage developed across load 3 by the generated current, and that load may be a resistance of, for example $10^{11}$ ohms. Depending upon the materials used and the surface conditions of each electrode, the voltage generated in the cell and applied across the load may be made of either polarity desired. For example, using an aluminum outer electrode with stainless steel center electrode, the generated current will flow in the external circuit from the center electrode to the outer one, while if a freshly brushed or sanded aluminum center electrode is substituted for the steel, the current will reverse in direction. The internal functioning of such cells appears to be as follows: Electrons produced by ionization within the cell flow to the electrode which is more active electro-chemically, while the positive ions flow to the more noble electrode, where they are neutralized. Electrons flows from the more active electrode through the external circuit to the more noble electrode to replenish those utilized in the neutralization process, and the quantity which flow varies with the ionization in the chamber. Hence, the current generated varies with the type and intensity of radiation incident upon the cell, the molecular weight, ionizing potential, and pressure of the gas separating the electrodes, and the nature of the electrodes themselves and their surfaces. Since the current varies directly with the pressure and the molecular weight of the filling gas, the sensitivity of the cells would be increased by using a heavy gas, xenon, at the highest feasible pressure; or by substituting for the gas ionizable liquids such as benzene and xylene, or semi-conducting solids such as germanium and fluorescent cadmium sulfide, the sensitivity may possibly be still further improved.

To obtain higher output voltages across my generators from a given amount of radiation, several individual cells may be cascaded within a single shell, and connected in series, as is shown in Figure 2. Open cylinder 6 is provided at one end with external threads to receive a correspondingly threaded, lead-plated, brass cap 7, and at the other end with internal threads to receive the flange 8 of a conductive sleeve 9. Electrical insulator 10 forms a cylinder concentric with cylinder 6, closed at the end abutting flange 8 save for a central aperture, but open at the opposite end. Supports 11, 11' are formed also from a good electrical insulator, and may be either an annular ring or simply supporting posts, depending on the shock-stability desired in the instrument. Plates 12–20, together with cap 7, form the electrodes of a series of cells within case 6. The even-numbered plates may be, for example, lead dioxide plated on gold, while the odd-numbered plates, like cap 7, may be lead plated on brass. The plates 12–19 are supported by their peripheries in four sets of grooves provided in supports 11, 11', and are arranged in pairs consisting of one plate of each kind. Plate 20 is provided with a central aperture through which a threaded portion of shaft 21 carrying nut 21' extends into a milled recess in insulator 22. An insulating sleeve 23 serves to mtaintain shaft 21 axially aligned with sleeve 9 so that there is no physical contact between the two coaxial surfaces. Space between the plates may be filled with an ionizable gas, such as argon, hydrogen, nitrogen, and the like, or by air. The type and pressure chosen depends upon the sensitivity desired.

In operation, the device is oriented to receive gamma radiation preferably through the cap 7. Ions and electrons produced within the respective chambers will flow toward the more noble and more active electrodes, respectively. The electrons necessay for recombination at the noble electrode will be replenished by the active electrode in contact therewith. A current is generated which flows from the positive cell terminal 21 through load 24 and indicating instrument 25 to the negative termnial 9, connected to cap 7.

Another useful embodiment of my invention is shown in the pocket-type beta-gamma radiation dosimeter of Figure 3. The cylindrical case 26 forms one electrode of the cell, the other electrode being a cylinder 27 open at one end and disposed concentrically within the case 26. A capacitor 28 may be mounted axially inside the case 26, to shield it from stray electrostatic pickup, and may have one terminal 29 rigidly fastened to the bottom thereof. The cylinder 27 is mounted upon the opposite extremity of the capacitor, and has a small opening in the surface 30 through which the terminal 31 of the capacitor extends. A flexible bellows or flexible diaphragm 32 forms the top of case 26 and carries gas-tight seal 33 through which electrical contact 34 extends from outside the case to a position just above the extremity of terminal 31. Rigid cap 35 fits over the bellows 32 and the outer extremity of contact 34, to prevent accidental depressing of the bellows. The case may be filled merely with air, or a gas such as argon at high pressure may be preferred for greater sensitivity. The outer electrode may be magnesium oxide, the inner electrode may be lead dioxide, and the gas may be argon at 3 atmospheres, in one successful embodiment.

Such dosimeters may be stored or carried uncharged on the person for indefinite periods of time. In the event of exposure to a sudden large quantity of radiation, as from an atomic explosion, in accordance with my discoveries, a charge will be deposited upon capacitor 28 in proportion to the intensity of radiation received. At sometime thereafter the dosimeter can be read by connecting terminal 34 to a conventional dosimeter reading instrument, such as a ballistic galvanometer or electrometer, which will indicate the integrated radiation received by the bearer. Then the unit may be shorted to remove the residual charge, and it is again ready for use.

The capacitor is preferably one having very excellent leakage resistance, so that the charge thereon need not be read immediately after exposure, and may be, for example, a "Glassmike," distributed by the Condenser Products Company, with capacity of .001 microfarads. The entire detection unit may be very small so that it can be carried conveniently in the pocket. The choice of electrodes is not restricted except by problems of fabrication, so long as the surfaces thereof are electrochemically dissimilar. For optimum sensitivity, however, the electrodes should be widely separated in the electro-chemical series and a heavy gas at a high pressure should be employed. For optimum portability, the electrodes are light metal foils, the filling gas is air at atmospheric pressure, and the cell is hermetically sealed.

A more efficient embodiment of my invention is shown in Figure 4. Cylindrical case 35 is threaded at one end to receive cap 36 and is provided at the other end with an extension 37. Disposed within the case are a series of annular plates 38–48, preferably equally spaced along and perpendicular to the axis of shaft 49. The odd-numbered plates may have a diameter at least greater than the inner diameters of spacers 51–56, so that each odd-numbered plate will make good electrical contact with the spacers and with the side walls of case 35. The central apertures prevent them from contacting shaft 49. Insulating spacers 50, of smaller diameter than those apertures, are carried on shaft 49 and extend through the apertures in each odd-numbered plate. These spacers, together with a series of conductive annular spacers 51–56, maintain the plates in the proper spaced relation. The even-numbered plates 38–48 are of smaller diameter, and are provided with a central aperture corresponding to diameter of shaft 49, so that each plate makes contact with that shaft. Insulating sleeve 60, also carried on shaft 49, abuts at one end against a shoulder 61 inside extension 37 and at the other end against plate 48. A threaded insulating spacer 62 engages the threaded end of shaft 49 to properly space the assembly inside case 35. A load resistance 57 may be connected between case 35 and shaft 49, and a current will be generated therethrough when gamma radiation traverses the case. The individual cells are effectively connected in parallel; hence, the current that flows will be larger than that available from a single cell only. The voltage developed may be conveniently measured by electrometer 58, and will increase along a smooth curve with an increase in load resistance, approaching some maximum value asymptotically.

The odd-numbered electrodes and the case may, for example, be brass plated with lead, while the even-numbered electrodes may be brass plated with gold. Again the filling gas may be air, but is preferably, but not necessarily, an inert gas such as argon, at several atmospheres pressure.

It will be appreciated that if alpha or soft beta radiations are to be monitored, the cap 7 and the internal electrodes must be very thin so as to be transparent to the radiation involved. The cap may include a thin window such as nylon or rubber hydrochloride, coated with a very thin coat of the selected electrode material, while the inner electrodes may be thin formvar, coated lightly with the desired electrode material, thin metallic foil, alpha-transparent carbon or magnesium oxide, or the like.

More efficient conversion of radioactive energy to electrical energy may be achieved by a coaxial construction of the cells, similar to the arrangement of Fig. 3, or cascaded and parallel connected to form a series of concentric annular chambers. With a radioactive source disposed inside of a hollow cylinder forming the central electrode, and seven concentric electrodes, a conversion efficiency of substantially .1 per cent has been achieved. Referring now to Fig. 6, a coaxial cell may comprise hollow cylindrical or tubular member 63, closed at the lower extremity to form a sample holder, and a plurality of concentric electrodes 64, 65, 66, 67, 68. Positive electrodes 64, 66 may be brass shim stock, plated with gold and then with lead dioxide, while negative electrodes 65, 67 may be brass shim stock plated with gold and then coated with magnesium, for example. Case 68 may be brass, internally coated with gold and then with lead dioxide to form a positive electrode. The space between the interleaved electrodes may be filled with a counter gas, preferably argon at 200 p. s. i. pressure, through passageway 69, which may be sealed from the atmosphere by a conventional valve, not shown, or sealed off in any other convenient manner.

The electrodes are interleaved as shown, and may be connected in parallel to increase total current output. The parallel connection is achieved through physically mounting the electrodes 64, 66, 68 to flange 70 and mounting the electrodes 65, 67 to plate 82, then connecting the external impedance 72 for deriving the current between the plate and the flange. Such construction requires that case 68 be insulated from plate 71, and electrical insulator 74 is provided therebetween.

Referring now to Fig. 7, if it be desired to count neutrons, the outer case 75 may be formed from a hydrogenous material such as polystyrene or the like, which serves as a proton radiator, and coated with the desired electrode material 76', such as carbon or magnesium oxide, for example. Alternatively, as shown in Fig. 8, the case 77 may be metal, coated with an inner liner 78 of a hydrogenous material such as polystyrene, coated with Aqua-dag (carbon). The liner may serve also as a support for the center electrode 79. That electrode may be formed from light metals such as copper, magnesium, or aluminum, as shown in Fig. 8 or from a hydrogenous material rendered conductive by coating with an electrode material dissimilar from the outer electrode, as shown in Fig. 7. In either case, an external impedance 80 or 80' may be connected between electrodes, and the current through the impedance may be measured in any conventional manner, such as by voltmeter 81 or 81'. To obviate errors due to gamma radiation, a cell sensitive only to gammas may be connected to a cell sensitive to both neutrons and gammas so that the current from the former is subtracted from that of the latter, giving a signal due only to the neutron flux. A coaxial arrangement of the cells is convenient for that purpose. In addition, neutrons may be utilized as the source of radiations, or may be detected, in chambers such as those previously described, when filling gas is itself a source of recoil particles, as are hydrogen, boron trifluoride, methane, and the like, used in conventional neutron detectors.

Much more precise radiation measurements can be made with my cells than with conventional counters or like sensitivity, without increasing the time constant of the associated current measuring circuits, because of a smoothing or damping effect which is a feature of my invention. This effect may be due to either or a combination of both of two characteristics of cell operation. The electrodes of my cells do not collect at once all the ions formed within the enclosed volume. Rather, I have found that there is a condition analagous to the space charge in a vacuum tube which obtains in the cells.

There is an abundance of ions, but only a relatively slow drift towards the electrodes. Therefore any statistical fluctuation in the source of radiation will be unobserved due to the presence of the ion cloud. In addition, many of the ions are lost to recombination. Since recombination is a function of the number of ions per unit volume of gas, it would increase and decrease as the quantity of radiation randomly increases or decreases. As a result of these effects, current flow in the cells is relatively constant, and the pointers of associated current-indicating meters do not hunt or fluctuate.

Table 1 lists several materials utilized as electrodes of my radioelectric cells. The further apart the materials in this table are chosen, the greater will be the open-circuit voltage of the cell. The material nearest the top of this table has the lower work function. Electrons will leave the surface of such material more readily than they will leave that of a material with a higher work function, so that it will form the positive electrode, while the one nearer the bottom of this table, having the higher work function, will form the negative electrode. The table is not exclusive, but merely shows a few of the possible electrode combinations. It will be noted that these materials fall in the same general positions as they appear in the electrochemical series.

*Table 1*

Lead dioxide on gold
Carbon (aquadag)
Copper oxide on copper
Gold, plated on copper
Copper
Silver
Nickel
Brass
Stainless steel
Nickel, 1% cobalt
Zinc
Lead
Brushed lead
Chromium
Cadmium
Aluminum Figure 5 illustrates the dependency of voltage developed with the kind and pressure of the filling gas for five selected gases and a constant intensity gamma source. For a single cell with gold and lead electrodes, connected across a resistance of $10^{11}$ ohms, the voltage developed is seen to increase with an increase in gas pressure for all the gases tested. The decided leveling off of the neopentane curve shows the effect of ion recombination taking place where complex molecules are involved. The helium, nitrogen, and argon curves are substantially linear in this particular range of pressures, but show that less current is generated when using these gases than when those of heavier molecular weight are employed. However, the gases with a complex molecular structure are generally decomposed by the radiations as much more rapidly than the less complex molecules, and are generally to be avoided if prolonged high sensitivity is required of the cell. The small negative value of voltage developed at very low pressures may result from the photoelectric effect, and it is reversed in polarity to the normal cell current.

It will be apparent that the teachings of my novel method and apparatus for generating electrical energy are not limited to the field of radiation detection, where they have found immediate application, but will be extremely useful in making a wide variety of different measurements and in providing new sources of electrical power. I have determined that the current generated in cells of the character described above is approximately proportional to the flux density, the electrochemical dissimilarity between electrodes, the molecular weight of the filling gas used, and the pressure of the gas. Therefore, suitably constructed cells may be utilized to measure pressure and vacuum, to determine the molecular weight of a gas, to analyze the content of alloys and gases, to measure the rate of growth of surface films on the electrodes, to measure humidity and for other like measurements which may suggest themselves to one skilled in the art, without departing from the spirit of my invention, which is not intended to be limited to the embodiments herein illustrated, but only by the scope of the following claims.

What is claimed is:

1. An instrument for detecting radioactive radiations without an external source of electromotive force comprising an envelope defining an ionization chamber, first and second electrochemically dissimilar electrodes disposed within said envelope to form the collecting electrodes of said chamber, an ionizable gaseous medium disposed therebetween within said envelope, an impedance, direct electrical connections between respective electrodes and opposite terminals thereof to allow current flow external to said detector when said gas is ionized, and an indicator calibrated in units of radiation intensity coupled to said impedance for measuring the magnitude of said current flow.

2. A radiation dosimeter comprising an outer metallic envelope, a filling gas, a flexible member sealing one end of said envelope, an electrical conductor insulated from said envelope and extending through an aperture in said flexible member, an inner electrode electrochemically dissimilar to said envelope and disposed therewithin, a capacitor electrically connected between said inner electrode and said envelope and disposed within said elements, said conductor being mounted so as to make electrical contact with said inner electrode when said flexible member is depressed, so that said capacitor may be discharged through said conductor when an external charge-measuring means is connected thereto.

3. Apparatus for detecting radioactive radiations comprising a conductive envelope, a series of interleaved electrochemically dissimilar electrodes disposed therewithin, means contacting alternate electrodes, the remainder of said electrodes each contacting said envelope, and an ionizable gas disposed between said electrodes within said envelope.

4. A detector for radioactive radiations comprising an envelope, at least one portion of said envelope being transparent to said radiations, an ionizable gas disposed therewithin, a support member provided with a plurality of spaced recesses, a plurality of electrode pairs, each comprising two plates having electrochemically dissimilar surfaces, a surface of each plate being in direct physical contact with a corresponding surface of the other plate, said electrode pairs engaging respective recesses in said support to form a series of axially aligned chambers, electrochemically dissimilar end plates bounding the external chambers so formed, and means for connecting said end plates to an external load impedance.

5. Apparatus according to claim 3 wherein said electrodes comprise alpha-transparent films supported by conductive support members, adjacent films having deposited thereon electrochemically dissimilar, conductive, alpha-transparent coatings, alternate electrode coatings being substantially similar, and said envelope is provided with an alpha-transparent window.

6. A detector especially sensitive to radiations of the neutron type comprising a tubular hydrogenous radiator forming a closed envelope filled with hydrogen gas, a thick conductive coating disposed on the inner surface of said radiator to form a first electrode, and a second electrode electrochemically dissimilar to said first disposed coaxially within said envelope, and means for coupling said electrodes to a load impedance.

7. A device for detecting radioactive radiations comprising a hollow central electrode for receiving a radioactive sample, at least two concentric electrodes, alternate electrodes being conductively interconnected and having surfaces substantially similar electrochemically, the surfaces of adjacent electrodes being electrochemically dissimilar; an ionizable gas disposed between adjacent electrodes; a load impedance and means for coupling adjacent electrodes to opposite terminals of said load impedance.

8. A radiation measuring device comprising a generator element provided with first and second electrochemically dissimilar electrodes and an ionizable gaseous medium disposed therebetween, and an external circuit consisting only of an impedance and an indicator calibrated in units of radiation intensity coupled to said impedance for measuring the current flow from said generator element when said medium is ionized by said radiation.

References Cited in the file of this patent

UNITED STATES PATENTS

| Number | Name | Date |
|---|---|---|
| 1,141,655 | Kott | Dec. 27, 1938 |
| 2,536,991 | Wollan et al. | Jan. 2, 1951 |
| 2,555,116 | Coleman | May 29, 1951 |
| 2,598,215 | Borokowski et al. | May 27, 1952 |
| 2,612,615 | Fehr et al. | Sept. 30, 1952 |

OTHER REFERENCES

A New Electronic Battery from "The Electrician," Oct. 31, 1924, page 497.